United States Patent [19]
Gandar

[11] Patent Number: 5,974,553
[45] Date of Patent: Oct. 26, 1999

[54] METHOD FOR POWERING ELEMENTS CONNECTED IN A TWO-WIRE BUS NETWORK TRANSMITTING BOTH POWER SUPPLY AND DATA INFORMATION PULSES

[75] Inventor: Marc Gandar, Grand-Lancy, Switzerland

[73] Assignee: Mediaflow, Inc., Portland, Oreg.

[21] Appl. No.: 08/902,672

[22] Filed: Jul. 30, 1997

[30] Foreign Application Priority Data

Jul. 31, 1996 [FR] France ................................. 93 09882

[51] Int. Cl.[6] ............................................. G06F 1/32
[52] U.S. Cl. .................... 713/300; 713/310; 713/320; 713/126
[58] Field of Search .................... 395/750.01, 750.02, 395/750.03, 306, 309; 713/300, 320, 310, 330, 340, 126, 129

[56] References Cited

U.S. PATENT DOCUMENTS

| | | | |
|---|---|---|---|
| 4,558,316 | 12/1985 | Yong | 340/825.06 |
| 4,761,810 | 8/1988 | Perry | 379/181 |
| 4,799,236 | 1/1989 | Janssen | 375/258 |
| 4,999,607 | 3/1991 | Evans | 340/533 |
| 5,473,635 | 12/1995 | Chevroulet | 375/287 |
| 5,687,326 | 11/1997 | Robinson | 395/285 |

*Primary Examiner*—Ayaz R. Sheikh
*Assistant Examiner*—Ario Etienne
*Attorney, Agent, or Firm*—Arthur L. Plevy

[57] ABSTRACT

The present invention relates to a powering method for elements connected in a two-wire bus type network wherein information frames of predetermined length are transmitted at predetermined times. The method consists of regularly sending on the two-wire bus a power supply pulse between the end of an information frame and the beginning of the next frame.

7 Claims, 2 Drawing Sheets

METHOD FOR POWERING ELEMENTS CONNECTED IN A TWO-WIRE BUS NETWORK TRANSMITTING BOTH POWER SUPPLY AND DATA INFORMATION PULSES

BACKGROUND OF THE INVENTION

1. Field of the Invention

The present invention relates to a local network of industrial or domestic type, for commanding and/or controlling several appliances by means of several distributed computers. The present invention more specifically relates to a system enabling the power supply of the appliances connected to the network via the network itself (remote power supply).

2. Discussion of the Related Art

It is generally necessary to supply each of the elements connected to a network, be it only to supply the interface circuits of these elements with the network. Most often, the network elements are not in a same casing, whereby each element has to be power-supplied individually, which increases the cost of the installation.

Telephone networks, for example, avoid this problem by a remote power supply of the telephone sets. However, a telephone network can only supply limited power due to the relatively high impedance of the lines and to the presence of line terminators.

There also exist so-called "carrier current" networks which convey information on the mains voltage which supplies the network elements. However, it is necessary to provide step-down transformers to supply the elements, which increases the cost and the bulk.

Another disadvantage of telephone or carrier current networks is that the information exchange rate is particularly low.

In high bandwidth networks, it could be devised to convey power on wires separated from those which carry the information. Such a solution however requires the use of specific cables and connectors which are thus much more expensive than those traditionally used in networks.

Further, providing additional wires increases the wiring error risks upon installation or repairing of the network, to such an extent that users prefer to supply the network elements individually.

SUMMARY OF THE INVENTION

An object of the present invention is to provide a remote power supply system which is inexpensive and compact on a high bandwidth network.

Another object of the present invention is to provide such a system which can supply significant power and use interconnect cables of standard type without any risk of connection error.

These objects are achieved by a method for powering elements connected in a two-wire bus type network wherein information frames of predetermined length are transmitted at predetermined times, including the step of regularly issuing on the two-wire bus a power supply pulse between the end of an information frame and the beginning of the next frame. The bus includes terminal impedances and the method includes the steps of disconnecting the terminal impedances at the beginning of the initial edges of the supply pulses; and reestablishing the connection of the terminal impedances to the bus during the final edges of the supply pulses.

According to an embodiment of the invention, the wires of the bus are short-circuited at the beginning of the final edges of the supply pulses.

According to an embodiment of the invention, the frame beginnings are determined by a master element of the network which also issues the supply pulses.

According to an embodiment of the invention, the level of the supply pulses corresponds to a no-data level on the two-wire bus.

According to an embodiment of the invention, a supply pulse is supplied by the closing of a switch which is reopened at a predetermined time interval before the beginning of the following frame, so that the level on the bus reaches its rest level before the beginning of the next frame.

The present invention also aims at a terminal impedance for a two-wire bus, coupled to a threshold detector and to control means for disconnecting the terminal impedance from the bus when the voltage level on the bus exceeds a first threshold, and reconnecting the terminal impedance to the bus when the voltage level on the bus goes below a second threshold after having reached a maximum value.

According to an embodiment of the invention, the control means are adapted to short-circuit the bus lines when the voltage level on the bus goes below a third threshold as it decreases towards the second threshold.

The foregoing objects, features and advantages of the present invention, will be discussed in detail in the following non-limiting description of specific embodiments, in connection with the accompanying drawings.

DETAILED DESCRIPTION

The present invention uses a network of conventional two-wire bus type, that is, wherein all elements are connected to a same pair of conductors to exchange information. To remotely supply the several elements connected to the two-wire bus, the present invention provides to transmit supply voltage pulses among the information frames over the bus wires. The several elements connected to the bus are then provided to exploit these supply pulses.

Due to the fact that only two wires convey both the information frames and the power supply, low-cost standard cables and conductors may be used. Preferably, a coaxial cable with which no polarity inversion error is possible will be used. The most current coaxial cables may convey relatively high powers which can reach several hundred watts without heating.

The issuing of supply voltage pulses cannot be performed in a network with any protocol without risking to cause errors due to the fact that the supply pulses can be interpreted as data or that they mask the frame data transmitted at the same time. The word "frame" refers to any uninterrupted succession of information circulating over the network.

The remote power supply method according to the present invention can only be implemented with a synchronous protocol according to which the data frames are of predetermined length and are transmitted at predetermined times also. The frame lengths and the transmission times should be known in advance by an element which generates the supply pulses. An example of synchronous protocol, according to which the frames are of constant length and periodically transmitted, is described in PCT patent application WO-96/07259.

Figure 1:
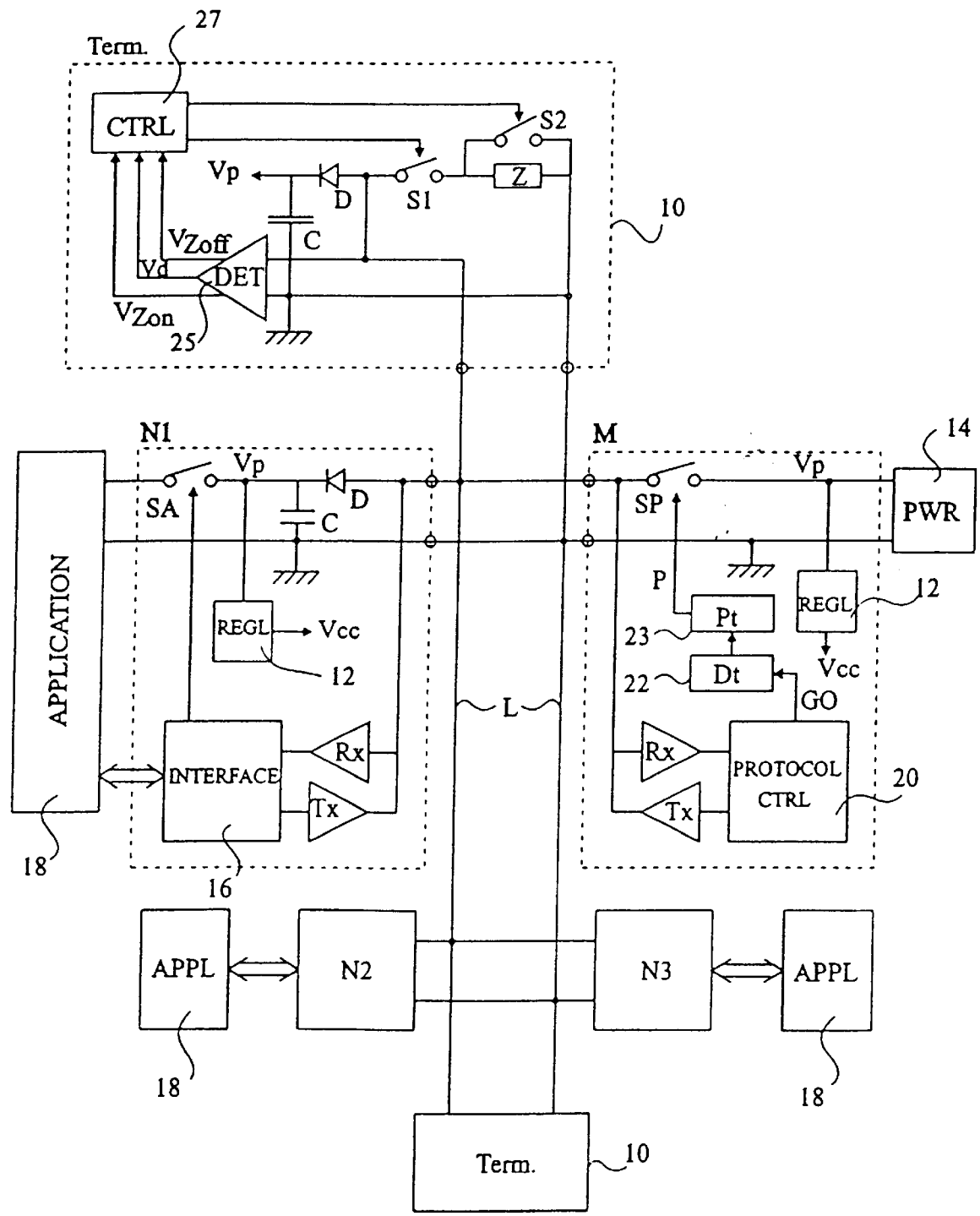
FIG. 1 schematically shows a network on which are connected elements permitting a remote power supply according to the present invention.

FIG. 1 schematically shows a bus-type network wherein the several elements are designed to implement a synchronous communication protocol, of the type described in the above-mentioned patent application. Further, each of the elements of this network is designed to implement the remote power supply method according to the present invention.

This network includes a master element M, several slave elements N1 to N3, and line terminators 10, all connected to a same two-wire bus-type link L. One of the bus wires, that is, the neutral wire, is grounded in each of the network elements, and the other is the live wire.

According to the present invention, each of the elements to be supplied includes a capacitor C, a terminal of which is directly connected to ground, that is, to the neutral wire of link L, and the other terminal of which is connected to the live wire of link L via a diode D. The supply voltage Vp of an element is taken across capacitor C and may be regulated by a voltage regulator 12 to supply a regulated voltage Vcc to the circuits which require it.

Master element M is designed to synchronously manage the information exchanges over the network, for example, in the way described in above-mentioned patent application WO-96/07259. Further, this master element M is in charge of providing the remote power supply. For this purpose, master element M has a switch SP connecting a voltage Vp supplied by a supply source 14 to the live wire of link L. The neutral of link L is connected to the ground of master element M and of supply source 14.

Each master or slave element further includes, conventionally, a reception amplifier Rx, the input of which is connected to the live wire of link L, and a transmission amplifier Tx, the output of which is connected to the live wire of link L.

In slave elements N, amplifiers Rx and Tx are further connected to an interface circuit 16 for communicating with an application circuit 18. Application circuit 18 is designed to be supplied from the voltage Vp taken across capacitor C of the corresponding slave element N. According to an alternative, a switch SA is provided which is controlled, according to a programming of interface 16, to interrupt the supply of circuit 18 from voltage Vp. Switch SA is open, for example, if application circuit 18 already includes an individual supply, or if an anomaly or a current overconsumption is detected in the circuit.

In master element M, amplifiers Rx and Tx are further connected to a protocol control circuit 20. Circuit 20 is designed, in the example of above-mentioned patent application WO-96/07259, to periodically cause the sending over link L of a frame of constant length. It is not useful for the understanding of the present invention to know the contents of these frames and the way in which they are exploited. Of course, the frame length is smaller than or equal to the frame period.

Actually, the protocol described in patent application WO-96/07259 is also meant to operate with a point-to-point network. In a point-to-point network, a frame arriving on an element may have crossed several other elements and have undergone a corresponding delay. The setting of both the frame period and the frame length enables to create a latency time between the end of a frame and the beginning of the next frame for compensating the delays in the network. According to the present invention, this latency time, during which no frame is likely to be present on link L, is used to send a remote power supply pulse. If necessary, this latency time may be increased to increase the transmittable power.

To implement the method according to the present invention, master element M includes, for example, a counter 22 provided to count down the duration Dt of a frame. This counter 22 is enabled by a signal GO supplied by protocol control circuit 20 at the beginning of each frame. Once the duration of a frame has been counted down by counter 22, the latter starts a counter 23 for counting down the duration Pt of a supply pulse. During this downcounting, counter 23 closes switch SP via a signal P. Of course, the sum of durations Dt and Pt is smaller than the frame transmission period.

Figure 2:
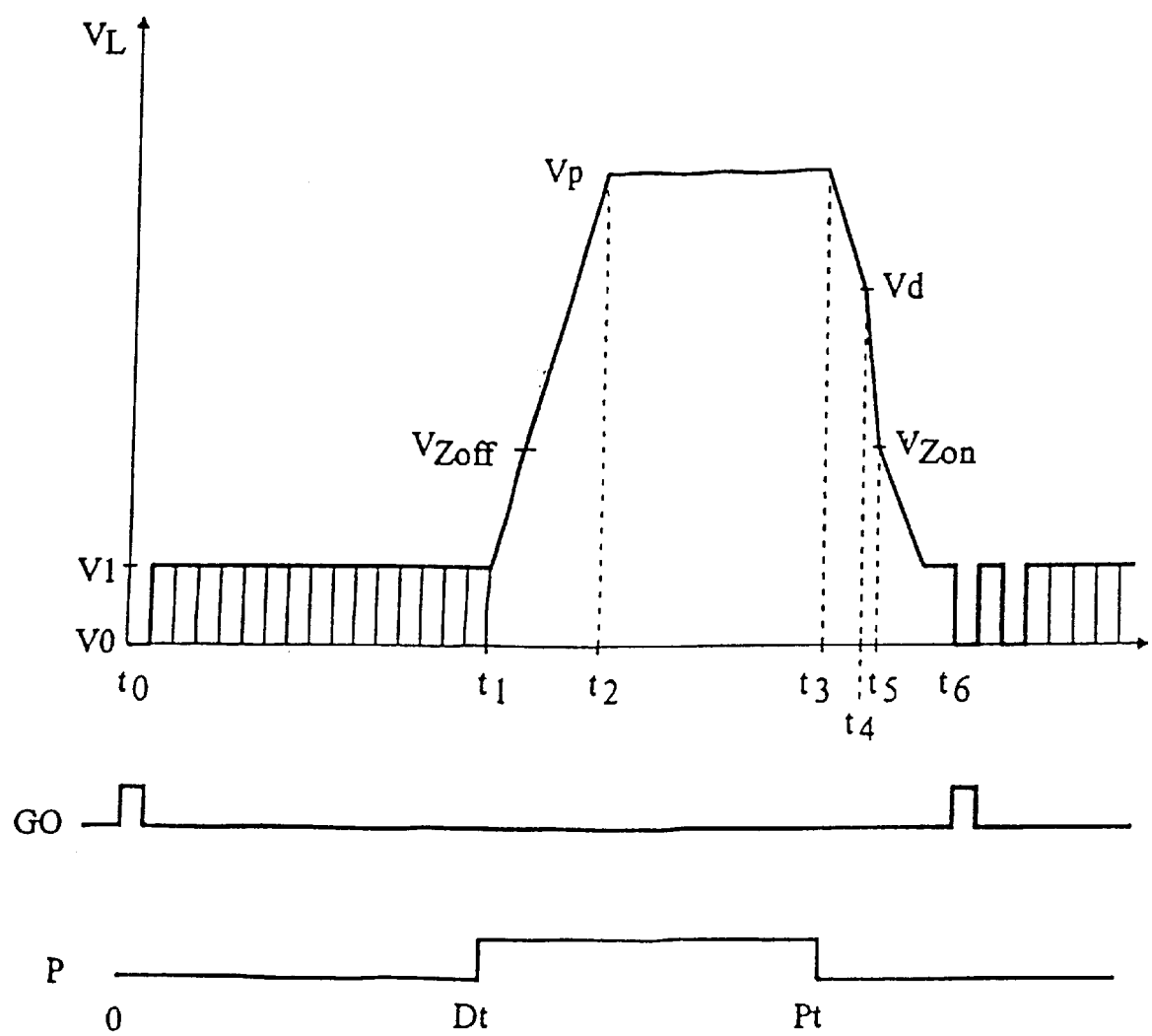
FIG. 2 shows an example of evolution of a signal conveyed over the network of FIG. 1 according to the present invention.

The operation of the remote power supply will be better understood in connection with the description of FIG. 2.

In a bus-type network, link L is conventionally terminated, at each end, by an impedance Z of relatively low value (of about 50 to 120 Ω), meant to avoid reflection problems. Such an impedance is likely to uselessly dissipate part of the power supplied by the supply pulses. In order to avoid this, the terminal impedances are replaced with line terminators 10 according to the present invention.

Each line terminator 10 includes a terminal impedance Z connected between the live wire and the neutral wire of link L via a switch S1. A threshold detector 25 receives the voltage level on link L and opens switch S1 when the voltage level exceeds a set threshold $V_{Zoff}$. Threshold $V_{Zoff}$ is chosen above the maximum level V1 reached on link L upon transmission of a frame. Thus, the useless current consumption in impedance Z is stopped as soon as possible.

Further, line terminator 10 includes a switch S2 connected across impedance Z. A control circuit 27 is associated with threshold detector 25 to close the two switches S1 and S2, and thus short-circuit the two lines of link L, when the voltage level on link L reaches, as it decreases, a threshold value Vd lower than the maximum level Vp of the supply pulses. This control circuit 27 opens switch S2, and thus normally connects terminal impedance Z to link L, when the voltage level on the link reaches, as it decreases, a threshold value $V_{Zon}$ which is higher than the maximum level V1 of the frames.

Of course, a line terminator 10 is supplied like the slave elements N from a capacitor C which is charged via a diode D during the supply pulses.

FIG. 2 illustrates an example of evolution of the voltage level $V_L$ on link L in the network of FIG. 1.

At a time t0, signal GO is asserted by control circuit 20 to indicate the beginning of the transmission of a frame on link L. At once, counter 22 starts counting down the duration Dt of the frame while the frame is being transmitted. Voltage $V_L$ on the link varies between a low level V0 and a high level V1 depending on the data transmitted in the frame.

The frame terminates at a time t1 and counter 23 is enabled to count down the duration Pt of the supply pulse. Signal P is asserted, which closes switch SP and connects the live wire of link L to voltage Vp supplied by power source 14. Voltage $V_L$ starts increasing while the capacitors C are being charged via the diodes D. Once voltage $V_L$ reaches threshold $V_{Zoff}$, as previously described, the terminal impedances Z are disconnected from link L by the opening of switch S1 in each line terminator 10.

At a time t2, the maximum value Vp of the supply pulse is reached. The capacitors C are then charged practically to voltage Vp.

At a time t3, counter 23 has counted down duration Pt of the supply pulse. Switch SP is reopened and voltage $V_L$ decreases, which corresponds to the discharge of the capacitance of the lines of link L. The capacitors C do not discharge via link L, due to the fact that the diodes D are then reverse-biased.

At a time t4, voltage $V_L$ reaches the threshold value Vd causing the closing of both switches S1 and S2 in each line terminator 10. The lines of link L are then short-circuited and discharge very rapidly.

At a time t5, voltage $V_L$ reaches the threshold value $V_{Zon}$ causing the opening of switch S2 of each line terminator 10, and thus the connection of the terminal impedances Z to the lines of link L. The lines end up discharging relatively fast through the impedances Z to reach a level which in principle is zero. Preferably, the final discharge level corresponds to no data on link L so that it is not mistaken for a datum by a slave element N. For this purpose, master element M may be designed to force the lines at rest to a no-data level, such as high level V1 in the example of FIG. 2. If low level V0, corresponding to the presence of data, is chosen to be negative, the lines may reach the zero level without risking an erroneous interpretation from slave elements N.

At a time t6, the next frame starts by the assertion of signal GO. Of course, switch SP was opened soon enough for the voltage level of link L to have effectively reached its rest value before time t6. For this purpose, the closing duration Pt of switch SP is chosen appropriately according to the capacitance of link L.

It should be noted that FIG. 2 is not to scale for sake of clarity. Threshold Vd is in practice chosen as close as possible to the maximum value Vp of the supply pulse and threshold $V_{Zon}$ is chosen to be as close as possible to value V1. A certain interval should be respected to avoid thresholds Vd and $V_{Zon}$ to be crossed by parasitic undulations of voltage $V_L$. Threshold value $V_{Zoff}$ is chosen to reach a compromise between the limitation of the power consumed in terminal impedances Z and the efficiency of the suppression of parasitic reflections.

The power transmitted to the network elements may be set by adjusting the amplitude of the voltage pulses as well as their duration Pt. Of course, amplifiers Rx and Tx of the network elements, which remain connected to the live wire of link L, must be designed to withstand the maximum level of the supply pulses.

The protocol described in above-mentioned patent application WO-96/07259 allows the slave elements N to be implemented in a particularly simple way. In particular, each slave element N just receives each frame , with no interaction at all with master element M, to recognize therein the data to its attention or an authorization for transmitting data in the frame. In this case, the voltage pulses are preferably of a level corresponding to the inactive level of the frames (the high level in FIG. 2), so that the slave elements do not interpret supply pulses as data.

If the level of the supply pulses cannot be chosen according to this criterion, each slave element should be provided with a circuit for disconnecting at least the reception amplifier Rx from link L upon occurrence of the supply pulses, which increases the complexity.

Of course, the present invention is likely to have various alterations, modifications, and improvements which will readily occur to those skilled in the art. In particular, the durations of the frames and the transmission periods thereof can vary, provided that their values are known in advance by the element which generates the supply pulses, here the master element. If the durations and periods vary, it is sufficient to reprogram counters 22 and 23 so that the supply pulses are contained between the end of each frame and the beginning of the next frame.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for powering elements connected in a two-wire bus type network wherein information frames of predetermined length are transmitted at predetermined times and wherein the bus includes terminal impedances, said method including the steps of regularly issuing on the two-wire bus a power supply pulse between the end of an information frame and the beginning of the next frame;

disconnecting the terminal impedances when the amplitude of the power supply pulse exceeds a threshold value associated with a rising edge of the supply pulse; and reestablishing the connection of the terminal impedances to the bus during a falling edge of the supply pulse.

2. The method according to claim 1, further comprising the step of short-circuiting the wires of the bus for a time interval associated with the falling edge of the supply pulse prior to reestablishing the connection of the terminal impedances to the bus.

3. The method according to claim 1, wherein the frame beginnings are determined by a master element of the network which also issues the supply pulses.

4. The method according to claim 1, wherein the amplitude level of the supply pulses corresponds to a no-data level on the two-wire bus.

5. The method according to claim 1, wherein a supply pulse is supplied by the closing of a switch which is reopened at a predetermined time interval before the beginning of the following frame, so that the level on the bus reaches its rest level before the beginning of the next frame.

6. A line terminator for a two wire bus, said two wire bus having a voltage applied there across, said line terminator comprising:

a terminal impedance switchably connected across said two wire bus;

a threshold detector for receiving the voltage level across said bus and associated with controller means for disconnecting the terminal impedance from the bus when the voltage level on the bus exceeds a first threshold $V_{Zoff}$ and for reconnecting the terminal impedance to the bus when the voltage level on the bus goes below a second threshold $V_{ZON}$ after having reached a maximum value $V_P$ as detected by said threshold detector.

7. The line terminator according to claim 6, wherein the control means are adapted to short-circuit the two-wire bus when the voltage level on the bus drops below a third threshold (Vd) as it decreases towards the second threshold.

* * * * *